(12) United States Patent
Miller

(10) Patent No.: US 7,710,078 B2
(45) Date of Patent: May 4, 2010

(54) BATTERY CHARGER WITH TEMPERATURE COMPENSATION

(75) Inventor: Shane Thomas Miller, Lynchburg, VA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 590 days.

(21) Appl. No.: 11/325,900

(22) Filed: Jan. 5, 2006

(65) Prior Publication Data

US 2007/0152639 A1    Jul. 5, 2007

(51) Int. Cl.
*H02J 7/04* (2006.01)
*H02J 7/16* (2006.01)

(52) U.S. Cl. ....................... 320/150; 320/154

(58) Field of Classification Search .......... 320/113, 320/150, 153, 154
See application file for complete search history.

(56) References Cited

U.S. PATENT DOCUMENTS

| | | | |
|---|---|---|---|
| 3,599,071 A | 8/1971 | Enghlen et al. | |
| 3,917,990 A * | 11/1975 | Sherman, Jr. | 320/150 |
| 4,125,802 A | 11/1978 | Godard | |
| 4,370,606 A | 1/1983 | Kakumoto et al. | |
| 4,558,270 A * | 12/1985 | Liautaud et al. | 320/110 |
| 4,755,735 A | 7/1988 | Inakagata | |
| 5,103,156 A * | 4/1992 | Jones et al. | 320/150 |
| 5,241,259 A | 8/1993 | Patino et al. | |
| 5,493,199 A | 2/1996 | Koenck et al. | |
| 5,519,303 A | 5/1996 | Goedken et al. | |
| 5,548,201 A | 8/1996 | Grabon | |
| 5,637,982 A | 6/1997 | Nanno et al. | |
| 5,659,240 A * | 8/1997 | King | 320/134 |
| 5,717,313 A | 2/1998 | Grabon | |
| 5,828,203 A * | 10/1998 | Lindeboom et al. | 320/150 |
| 5,874,825 A | 2/1999 | Brotto | |
| 5,912,547 A | 6/1999 | Grabon | |
| 6,037,747 A * | 3/2000 | Chalasani et al. | 320/125 |
| 6,160,383 A | 12/2000 | Carkner | |
| 6,211,655 B1 | 4/2001 | Hardie | |
| 6,249,107 B1 | 6/2001 | Wolfe et al. | |
| 6,252,380 B1 * | 6/2001 | Koenck | 320/150 |
| 6,271,643 B1 * | 8/2001 | Becker et al. | 320/112 |
| 6,278,260 B1 * | 8/2001 | Yang | 320/150 |
| 6,307,349 B1 | 10/2001 | Koenck et al. | |
| 6,307,353 B1 * | 10/2001 | Shiojima | 320/139 |
| 6,388,428 B1 | 5/2002 | Rouverand et al. | |
| 6,489,751 B2 | 12/2002 | Small et al. | |
| 7,208,916 B1 * | 4/2007 | Boatwright et al. | 320/150 |
| 2001/0000212 A1 * | 4/2001 | Reipur et al. | 320/104 |
| 2001/0001533 A1 * | 5/2001 | Stuck Andersen et al. | 320/150 |

(Continued)

*Primary Examiner*—Edward Tso
*Assistant Examiner*—Arun Williams
(74) *Attorney, Agent, or Firm*—Allen, Dyer, Doppelt, Milbrath & Gilchrist, P.A.

(57) ABSTRACT

A battery charger and method for charging a battery are provided. The method includes comparing a battery temperature with an environmental temperature, charging the battery in a normal charge state if the battery temperature is greater than the environmental temperature and charging the battery in a warm charge state if the battery temperature is not greater than the environmental temperature. The method further includes monitoring a difference between the battery temperature and the environmental temperature when charging in the warm charge state, and switching from the warm charge state to the normal charge state when the difference between the battery temperature and the environmental temperature is within a predetermined range.

20 Claims, 4 Drawing Sheets

U.S. PATENT DOCUMENTS

| | | | |
|---|---|---|---|
| 2002/0024321 A1* | 2/2002 | Rouverand et al. | 320/150 |
| 2002/0101219 A1* | 8/2002 | Yuasa et al. | 320/150 |
| 2003/0080713 A1* | 5/2003 | Kirmuss | 320/150 |
| 2003/0169017 A1* | 9/2003 | Ariga et al. | 320/125 |
| 2004/0135551 A1 | 7/2004 | Hoff et al. | |
| 2004/0135552 A1* | 7/2004 | Wolin et al. | 320/150 |
| 2004/0135553 A1 | 7/2004 | Sakakibara | |
| 2004/0145352 A1* | 7/2004 | Harrison | 320/150 |
| 2004/0263119 A1* | 12/2004 | Meyer et al. | 320/116 |
| 2005/0099163 A1 | 5/2005 | Liepold | |
| 2005/0253561 A1* | 11/2005 | Tibbs | 320/150 |
| 2006/0132099 A1* | 6/2006 | Aradachi et al. | 320/150 |
| 2007/0139017 A1* | 6/2007 | Marchand et al. | 320/150 |

* cited by examiner

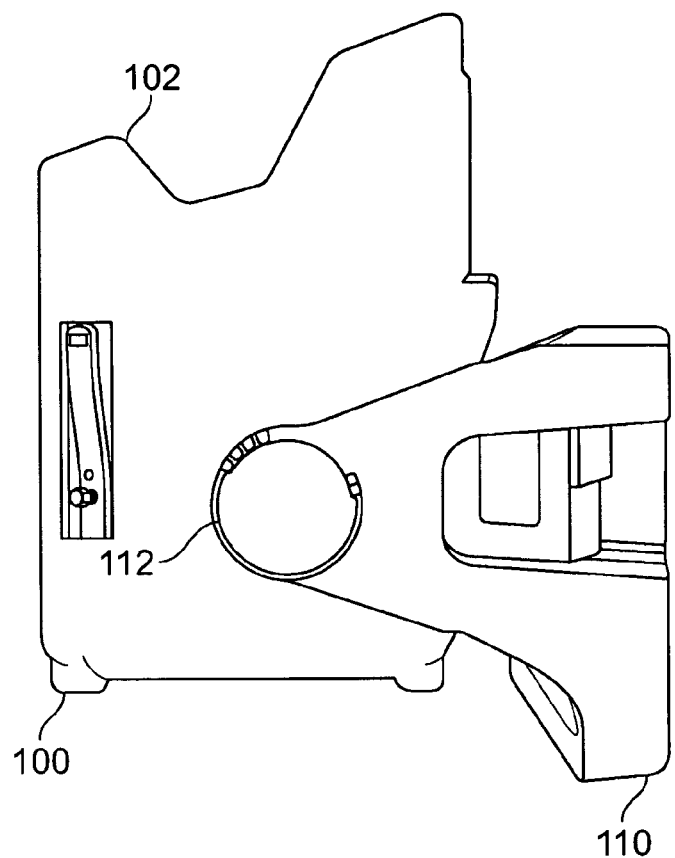
FIG. 4B
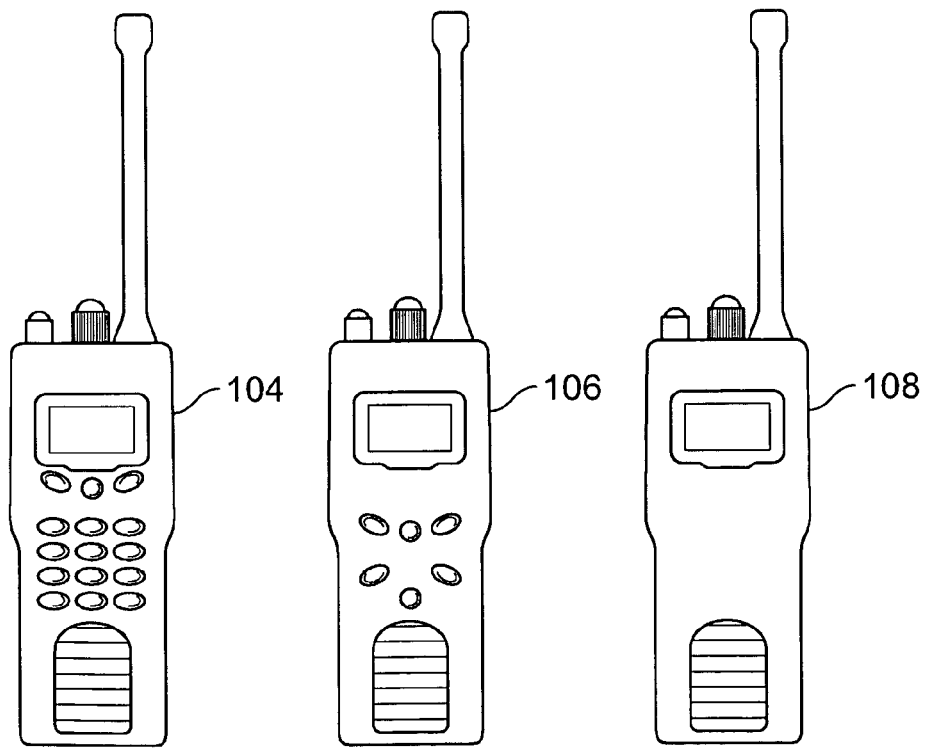
FIG. 5A     FIG. 5B     FIG. 5C

BATTERY CHARGER WITH TEMPERATURE COMPENSATION

BACKGROUND OF THE INVENTION

This invention relates generally to battery chargers, and more particularly, to controlling the charging of batteries with battery chargers.

Battery chargers are used in many different applications to charge batteries, such as batteries for portable and mobile devices (e.g., land mobile radios). These battery chargers range from wall connected units to car connected units. Different battery chargers also may provide different rates of charging and different charge levels based on, for example, the type of battery.

Rechargeable batteries may be constructed of different materials and provided in different cell configurations. For nickel based rechargeable batteries, such as nickel-cadmium (nicad or NiCd) or nickel metal hydride (NiMH), different methods are known to determine when to terminate charging of the battery. These methods determine when the battery is fully charged within a tolerance range. One known method for terminating charging is to monitor the temperature gradient ($\Delta T/dt$) of a battery pack. Once a battery approaches a full charge, the battery can no longer absorb the charging energy and converts the energy to heat. The charging of the battery is terminated when the slope of the change in temperature of the battery reaches a certain level, for example, one degree Celsius per minute.

Known methods for monitoring the change in slope of the battery temperature may not always adequately indicate that a battery is fully charged. For example, when a cool battery is charged in a warm or elevated temperature environment, for example, in a car using a car charger, the environmental heat can warm the battery pack. This increase in the temperature gradient due to the environmental temperature absorbed by the battery results in early termination of the charge prior to a full charge state. Thus, known chargers using these methods of charging may prematurely terminate charging of a battery due to environmental effects and not based on charging effects.

BRIEF DESCRIPTION OF THE INVENTION

In one exemplary embodiment, a method for controlling battery charging is provided. The method includes comparing a battery temperature with an environmental temperature, charging the battery in a normal charge state if the battery temperature is greater than the environmental temperature and charging the battery in a warm charge state if the battery temperature is not greater than the environmental temperature. The method further includes monitoring a difference between the battery temperature and the environmental temperature when charging in the warm charge state, and switching from the warm charge state to the normal charge state when the difference between the battery temperature and the environmental temperature is within a predetermined range.

In another exemplary embodiment, a charge monitor for a battery charger is provided that includes an environmental temperature sensor configured to monitor an environmental temperature and a comparator configured to compare the environmental temperature with a battery temperature from a battery temperature sensor of a battery being charged. The charge monitor further includes a charge controller configured to operate in a normal charge state if the battery temperature is greater than the environmental temperature and to operate in a warm charge state if the battery temperature is not greater than the environmental temperature. Charging is switched from the warm charge state to the normal charge state when the difference between the battery temperature and the environmental temperature is within a predetermined range.

In yet another exemplary embodiment, a battery charger is provided that includes an interface for connection to a battery to be charged and a charge monitor. The charge monitor includes a comparator configured to compare a sensed battery temperature with a sensed environmental temperature and a charge controller configured to operate in a normal charge state if the battery temperature is greater than the environmental temperature and to operate in a warm charge state if the battery temperature is not greater than the environmental temperature. Charging is switched from the warm charge state to the normal charge state when the difference between the battery temperature and the environmental temperature is within a predetermined range.

BRIEF DESCRIPTION OF THE DRAWINGS

FIG. 4B is a side elevation view of the battery charger of FIG. 4A.

FIGS. 5A-5C are front plan views of portable devices having rechargeable batteries that may be recharged in accordance with various embodiments of the invention.

DETAILED DESCRIPTION OF THE INVENTION

Various embodiments of the invention provide a battery charger and method for charging a battery. During charging, compensation for environmental effects, and in particular, environmental heat is provided. It should be noted that although reference may be made herein to a particular kind or type of battery and charger, the various embodiments are not so limited and may be implemented in connection with any kind or type or battery. For example, a battery charger constructed according to various embodiments of the invention may used to charge any type of rechargeable battery, for example, any battery having a nickel based chemistry.

Figure 1:
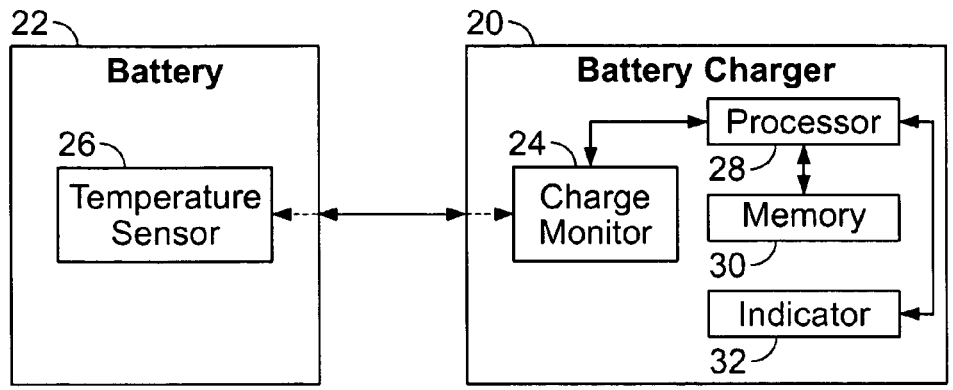
FIG. 1 is a block diagram of a battery charger constructed in accordance with various embodiments of the invention.

In general, various embodiments of the invention provide a system and method for charging a battery that may be implemented in connection with any type of battery charger. For example, the various embodiments may be implemented in connection with a battery charger configured for connection to a wall outlet power source (e.g., 120 volt outlet) or an in-vehicle power source, such as, a cigarette lighter or auxiliary power outlet (e.g., 12 volt outlet). More particularly, as shown in FIG. 1, a battery charger 20 is provided and configured for connection to a battery 22. The battery charger 20 includes a charge monitor 24 that communicates with a battery temperature sensor 26 (e.g., thermistor) when the battery 22 is connected to the battery charger 20.

The battery charger 20 also includes a processor 28 connected to the charge monitor 24. A memory 30 and an indicator 32 (e.g., light emitting diode) are also both connected to the processor 28. In operation, the charge monitor 24 monitors the charging of the battery 22 to determine when the battery 22 has reached a full charge.

Figure 2:
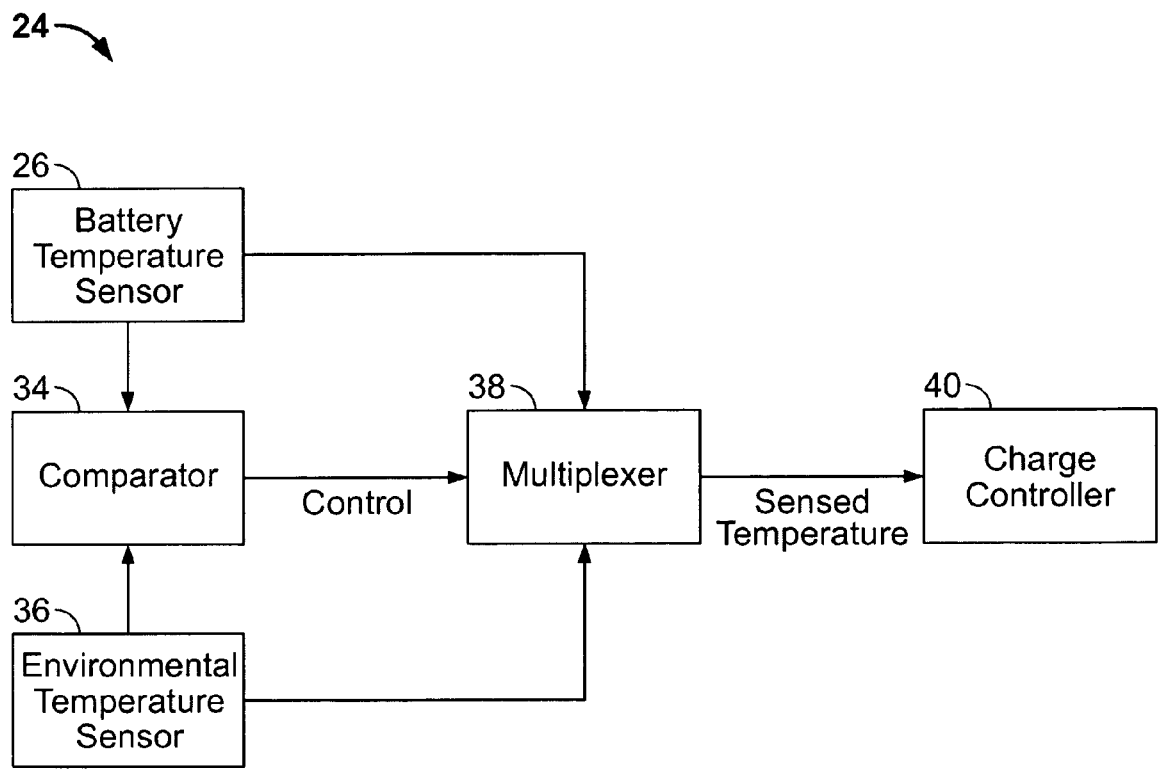
FIG. 2 is a block diagram of a charge monitor of the battery charger of FIG. 1.

The charge monitor 24 is shown in more detail in FIG. 2, and may be configured, for example, as a charge monitor circuit. The charge monitor 24 includes a comparator 34 that is connected to an environmental temperature sensor 36 and the battery temperature sensor 26 of the battery 22 (shown in FIG. 1). It should be noted that the interface of the battery 22 to the battery charger 20 may be provided in any known manner, for example, using copper contacts on the battery case or battery pack. This interface provides communication between the charge monitor 24, and more particularly, the comparator 34 and the battery temperature sensor 26. Additionally, the environmental temperature sensor 36 may be implemented using different temperature sensing or temperature measuring devices, including, for example, a thermometer device, or any other suitable device. The charge monitor 24 also includes a multiplexer 38 connected to each of the battery temperature sensor 26, the environmental temperature sensor 36 and the comparator 34. The multiplexer 38 is also connected to a charge controller 40.

In operation, the charge monitor 24 monitors the charging of the battery 22 to compensate for environmental effects and conditions, such as, environmental heat that may be absorbed by the battery 22. The monitoring of the charging of the battery 22 is based in part on the sensed environmental temperature as determined by the environmental temperature sensor 36. More particularly, the comparator 34 compares the temperature of the battery 22 as sensed by the battery temperature sensor 26 and the temperature of the environment (e.g., inside a vehicle) as sensed by the environmental temperature sensor 36. The comparator 34 compares the values of the temperature as received by the battery temperature sensor 26 and the environmental temperature sensor 36 to determine which of these temperature values is higher. The higher temperature value is communicated to the charge controller 40 as the sensed temperature. Specifically, the multiplexer 38 switches the sensed temperature output provided to the charge controller 40 between a sensed temperature received from the battery temperature sensor 26 and a sensed temperature received from the environmental temperature sensor 36 depending on which temperature value is higher.

In an exemplary embodiment, if the comparator 34 determines that the sensed temperature from the battery temperature sensor 26 is higher than the sensed temperature from the environmental temperature sensor 36, then the multiplexer 38 is switched such that the sensed temperature from the battery temperature sensor 26 is communicated to the charge controller 40 as the sensed temperature. Charging of the battery 22 (shown in FIG. 1) proceeds in a normal state, which in one embodiment, includes the charge controller 40 terminating charging of the battery 22 when it is determined that a rate of temperature increase of the battery 22 as sensed by the battery temperature sensor 26 exceeds a predetermined temperature gradient. For example, when the temperature rise or slope exceeds one degree Celsius per minute the charge controller 40 terminates charging, which may include turning off the battery charger 20 and providing a visual indication with the indicator 32 (shown in FIG. 1). The visual indicator may be provided such that different colors are displayed via the indicator 32 depending on the state of the battery charger 20, for example, red for off, yellow for charging and green for fully charged.

It should be noted that the received sensed temperature values may be stored in the memory 32 (shown in FIG. 1). Using this stored sensed temperature information the slope or change in the sensed temperature can be determined and used to determine whether to terminate charging of the battery 22 (shown in FIG. 1) as described above in more detail. Additionally, the processing of information may be performed using the processor 28 (shown in FIG. 1). This processing may include, for example, determining the temperature slope based on received sensed temperature information.

If the comparator 34 determines that the sensed temperature from the environmental temperature sensor 36 is higher than the sensed temperature from the battery temperature sensor 26, indicating that the battery 22 is cooler than the environmental temperature, then the multiplexer 38 is switched such that the sensed temperature from the environmental temperature sensor 36 is communicated to the charge controller 40 as the sensed temperature. Charging of the battery 22 continues in a warm charge state. In this warm charge state, charging may be performed at a normal charge rate or at a modified charge rate (e.g., faster or slower charge rate). The charge controller 40 remains in this warm charge state until the comparator 34 determines that the sensed temperature from the battery temperature sensor 26 is within a predetermined temperature range of the sensed temperature from the environmental temperature sensor 36, for example, when the difference between the sensed battery temperature and the sensed environmental temperature is within a predetermined threshold. The multiplexer 38 is then switched such that the sensed temperature from the battery temperature sensor 26 is communicated to the charge controller 40 as the sensed temperature. Charging of the battery 22 then proceeds in the normal state as described above.

Figure 3:
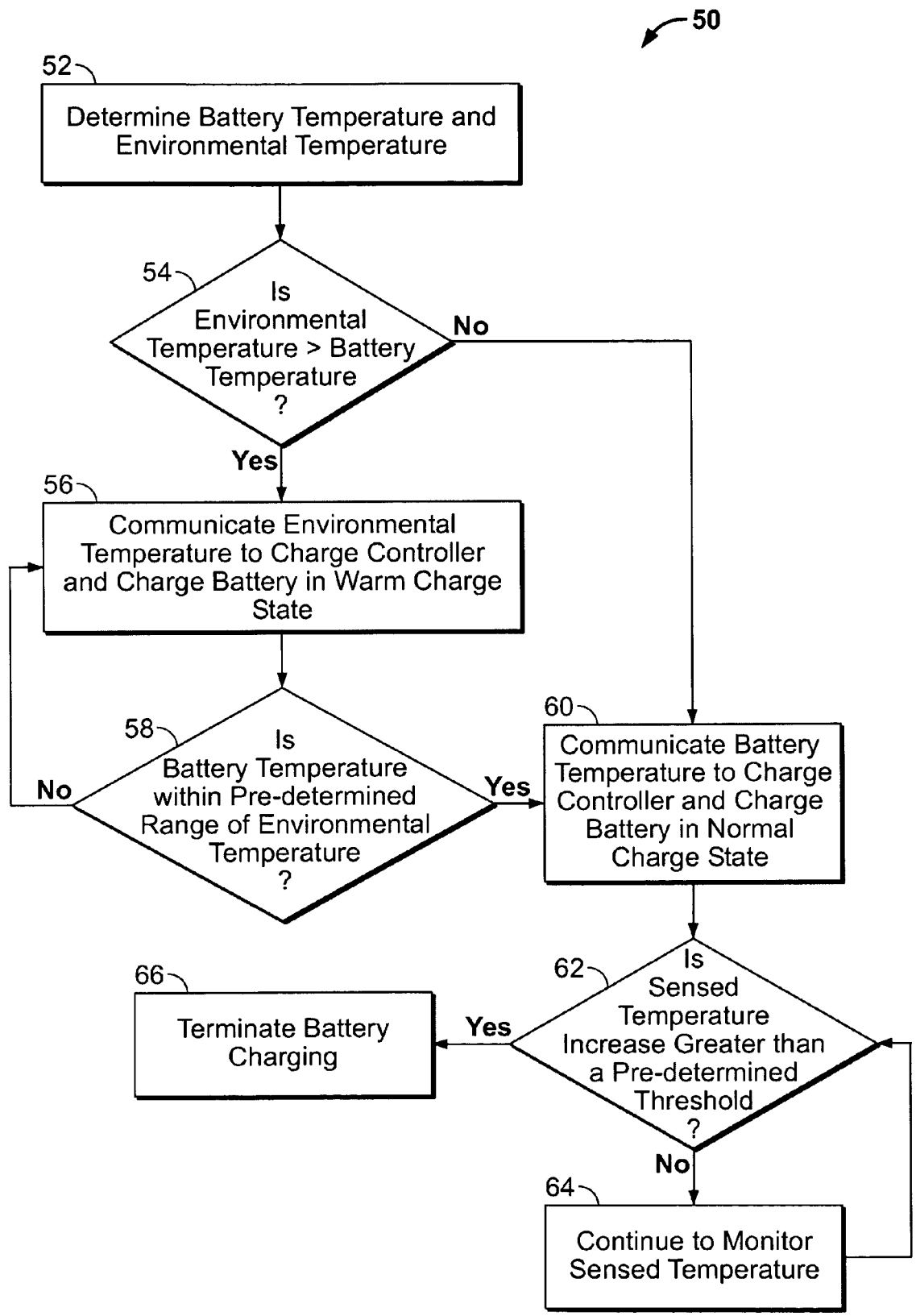
FIG. 3 is a flowchart of a method for controlling charging a battery in accordance with various embodiments of the invention.

More particularly, various embodiments of the invention provide a method 50 for controlling charging of a battery, and more particularly, for determining when to terminate charging of the battery. Specifically, as shown in FIG. 3, at 52 the temperature of a battery being charged and the temperature of the environment are both determined. For example, using a temperature sensor in the battery, such as a thermistor, the temperature of the battery is determined. Additionally, using a temperature sensing device, which may be integrated with a battery charger, the environmental temperature is determined. For example, when charging a portable device, such as a land mobile radio, in a vehicle, the temperature of the battery and the temperature of the vehicle are both determined. It should be noted that the temperature of the battery and environment may be sensed, for example, continuously or periodically.

After the battery temperature and environmental temperature are determined, then at 54 a determination is made as to whether the environmental temperature is greater than the battery temperature. This determination may be made continuously or periodically upon receiving sensed temperature updates. If it is determined that the environmental temperature is higher than the battery temperature, then at 56 the environmental temperature is communicated to a charge controller and the battery is charged in a warm battery state. In this warm charge state, charging may be performed at a normal charge rate (the same as in a normal charge state) or at a modified charge rate (e.g., faster or slower charge rate). Further, in this warm battery state, a determination is then made at 58 as to whether the environmental temperature is within a predetermined range of the battery temperature. For example, the received sensed battery temperature is compared to the received sensed environmental temperature to determine if the sensed battery temperature has increased to a value or level with a predetermined range (e.g., one to three degrees) of the sensed environmental temperature. This comparison may be made continuously or upon receiving sensed temperature updates. If the sensed battery temperature is not within a predetermined range of the sensed battery temperature, then the charging remains in the warm charge state at 56.

If at 58 a determination is made that the sensed battery temperature is within a predetermined range of the sensed environmental temperature or if at 54 it is determined that the environmental temperature is not greater than the battery temperature, then at 60 the battery temperature is communicated to the charge controller and the battery is charged in a normal charge state. In this normal charge state a determination is made at 62 whether the sensed temperature, which is the sensed battery temperature, and more particularly, the rate of temperature increase is increasing at greater than a predetermined temperature gradient threshold level. For example, a determination may be made as to whether the sensed temperature is increasing at a rate greater than one degree Celsius per minute or some other predetermined value. In this normal charge state the slope of the temperature of the battery is determined in order to determine whether the battery is fully charged and charging should be terminated.

If at 62 a determination is made that the increase in sensed temperature is not greater than the threshold temperature gradient, then at 64 the sensed temperature continues to be monitored. If at 62 a determination is made that the increase in sensed temperature is greater than the threshold temperature gradient, then at 66 battery charging is terminated. It should be noted that the slope of the temperature gradient may be measured continuously or at predetermined time intervals, for example, approximately every thirty seconds.

Figure 4A:
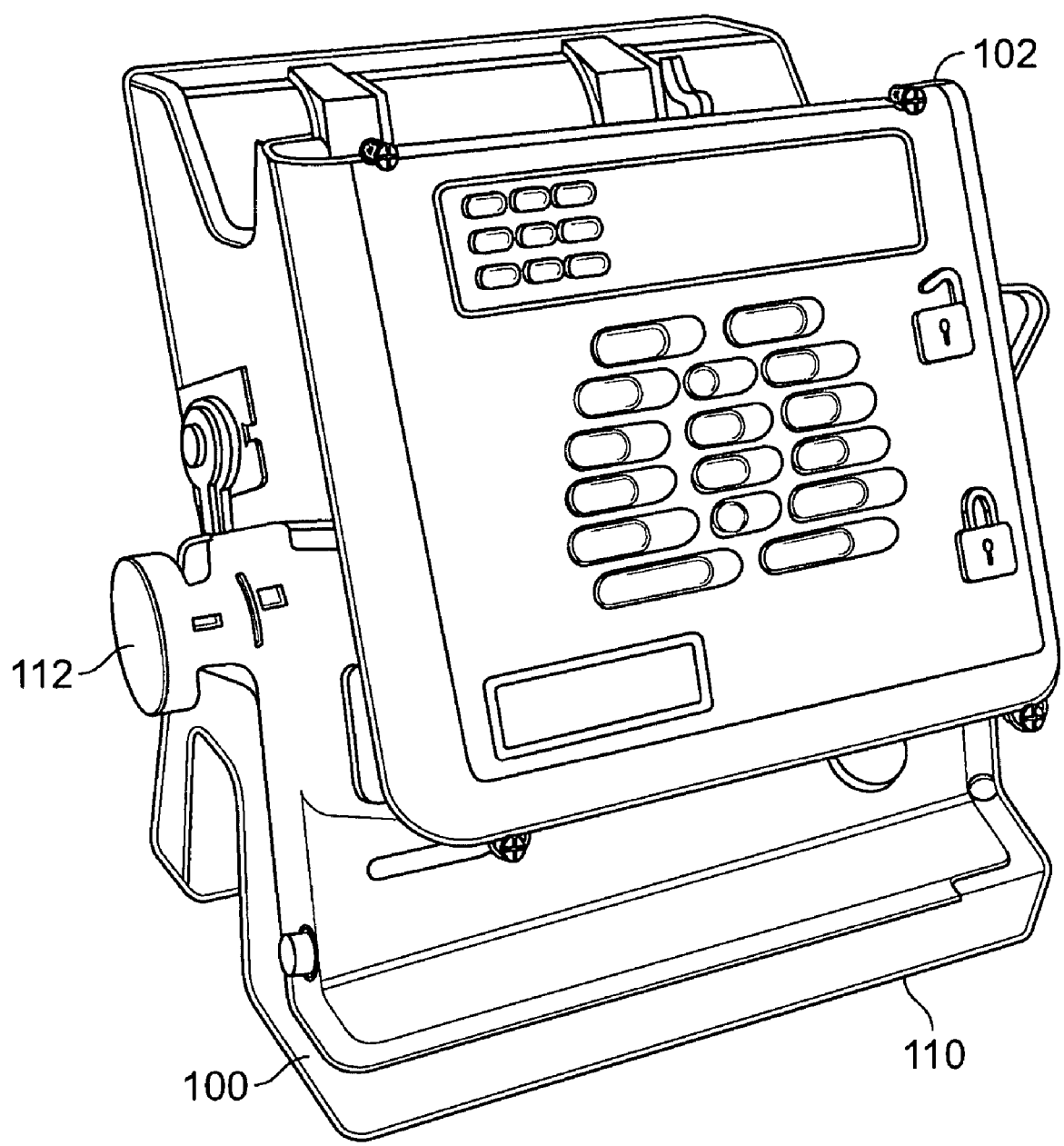
FIG. 4A is a perspective view of a battery charger constructed in accordance with various embodiments of the invention.

Thus, using various embodiments of the invention, a charger, such as a land mobile radio charger 100 as shown in FIGS. 4A and 4B, respectively, may be controlled such that battery charging compensates for environmental effects, and in particular, the environmental temperature. The land mobile radio charger 100 may include a charging or cradle portion 102 configured to receive therein a land mobile radio or land mobile radio battery to be charged. For example, a land mobile radio 104, 106 or 108 as shown in FIGS. 5A, 5B and 5C, respectively, may be connected to the land mobile radio charger 100, and charged in both cold and warm environments. The land mobile radio 104, 106 or 108 may be a P7100, P7200, P800 or P801 portable land mobile radio with the land mobile radio charger 100 being a corresponding charger, all available from M/A-COM, a unit of Tyco Electronics. Further, the land mobile radio charger 100 may have a mounting portion 110 for mounting to, for example, the interior of a vehicle, such as on a dash or floorboard. A pivoting member 112 also may be provided to pivotally mount the charging or cradle portion 102. It should be noted that the various embodiments are not limited to land mobile radio applications and may be implemented in any application and with any type and kind of battery and charger.

The various embodiments and/or components, for example, a battery charger or charge monitor, or components or controllers therein, may be implemented as part of one or more computers or processors, which may be separate from or integrated with the battery charger or charge monitor. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Thus, various embodiments of the invention provide a battery charger or method of charging a battery that compensates for the environmental temperature in which a battery is being charged. Using the various embodiments, the likelihood of early termination of battery charging prior to a full charge, particularly in a warm environment, is reduced or eliminated.

While the invention has been described in terms of various specific embodiments, those skilled in the art will recognize that the invention can be practiced with modification within the spirit and scope of the claims.

What is claimed is:

1. A method for controlling battery charging, said method comprising:

comparing a battery temperature with an environmental temperature;

charging the battery in a normal charge state at a normal charge rate if the battery temperature is greater than the environmental temperature beginning at a transition to a positive temperature difference;

charging the battery in a warm charge state at a charge rate faster than the normal charge rate if the battery temperature is not greater than the environmental temperature beginning at a transition to a negative temperature difference;

monitoring a difference between the battery temperature and the environmental temperature when charging in the warm charge state; and switching from the warm charge state to the normal charge state when the difference between the battery temperature and the environmental temperature is within a predetermined range.

2. A method in accordance with claim 1 further comprising terminating charging of the battery in the normal charge state when a temperature gradient increase of the battery temperature exceeds a predetermined threshold.

3. A method in accordance with claim 1 wherein the predetermined range is between about one degree Celsius and about three degrees Celsius.

4. A method in accordance with claim 1 further comprising providing to a charge controller the higher of the battery temperature and the environmental temperature.

5. A method in accordance with claim 1 wherein the charging is performed using an in-vehicle charger.

6. A method in accordance with claim 1 wherein the battery is configured to power a land mobile radio.

7. A method in accordance with claim 1 further comprising sensing the environmental temperature using a temperature sensing device of a battery charger.

8. A method in accordance with claim 1 wherein the monitoring is performed one of continuously and periodically.

9. A method in accordance with claim 1 further comprising terminating charging of the battery based on a predetermined temperature gradient threshold and wherein the terminating only occurs in the normal charge state.

10. A charge monitor for a battery charger, said charge monitor comprising:
an environmental temperature sensor configured to monitor an environmental temperature;
a comparator configured to compare the environmental temperature with a battery temperature from a battery temperature sensor of a battery being charged to determine a higher of the environmental temperature and battery temperature; and
a charge controller receiving the determined higher temperature and configured to operate in a normal charge state at a normal charge rate if the battery temperature is greater than the environmental temperature beginning at a transition to a positive temperature difference, and to operate in a warm charge state at a charge rate faster than the normal charge rate if the battery temperature is not greater than the environmental temperature beginning at a transition to a negative temperature difference, and wherein charging is switched from the warm charge state to the normal charge state when the difference between the battery temperature and the environmental temperature is within a predetermined range.

11. A charge monitor in accordance with claim 10 further comprising a multiplexer for switching an input to the charge controller between the sensed battery temperature and the sensed environmental temperature.

12. A charge monitor in accordance with claim 11 wherein the multiplexer is configured to switch between the battery temperature sensor and the environmental temperature sensor based on which sensed temperature is higher.

13. A charge monitor in accordance with claim 10 wherein the charge controller is configured to terminate charging in the normal charge state when a temperature gradient increase of the battery temperature exceeds a predetermined threshold.

14. A charge monitor in accordance with claim 10 wherein each of the battery temperature sensor and the environmental temperature sensor is configured to periodically measure temperature.

15. A charge monitor in accordance with claim 10 wherein each of the battery temperature sensor and the environmental temperature sensor is configured to continuously measure temperature.

16. A battery charger comprising:
an interface for connection to a battery to be charged; and
a charge monitor having a comparator configured to compare a sensed battery temperature with a sensed environmental temperature and a charge controller configured to operate in a normal charge state at a normal charge rate if the battery temperature is greater than the environmental temperature beginning at a transition to a positive temperature difference, and to operate in a warm charge state at a charge rate faster than the normal charge rate if the battery temperature is not greater than the environmental temperature beginning at a transition to a negative temperature difference, and wherein charging is switched from the warm charge state to the normal charge state when the difference between the battery temperature and the environmental temperature is within a predetermined range.

17. A battery charger in accordance with claim 16 wherein the interface is configured to engage a land mobile radio battery.

18. A battery charger in accordance with claim 16 further comprising memory configured to store sensed temperature information.

19. A battery charger in accordance with claim 16 wherein the charge monitor comprises a multiplexer for switching between a sensed battery temperature and a sensed environmental temperature.

20. A battery charger in accordance with claim 16 wherein the charge monitor is configured to terminate battery charging only in the normal charge state based on a predetermined temperature gradient threshold.

* * * * *